(12) United States Patent
Hara

(10) Patent No.: US 7,154,084 B2
(45) Date of Patent: Dec. 26, 2006

(54) OPTICAL-SCANNING MICROSCOPE APPARATUS

(75) Inventor: Mitsuhiro Hara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/175,619

(22) Filed: Jul. 6, 2005

(65) Prior Publication Data

US 2006/0118710 A1    Jun. 8, 2006

(30) Foreign Application Priority Data

Jul. 12, 2004    (JP)    ............... 2004-204920

(51) Int. Cl.
*G02B 27/40* (2006.01)
(52) U.S. Cl. .................... 250/234; 250/201.3; 359/368
(58) Field of Classification Search ........ 250/234–236, 250/201.3, 216; 359/368, 379, 384
See application file for complete search history.

(56) References Cited

U.S. PATENT DOCUMENTS

| | | | |
|---|---|---|---|
| 4,997,242 A * | 3/1991 | Amos | ......................... 359/202 |
| 5,144,477 A | 9/1992 | White | |
| 5,936,764 A | 8/1999 | Kobayashi | |
| 6,211,988 B1 | 4/2001 | Engelhardt | |
| 2002/0008904 A1 | 1/2002 | Engelhardt | |
| 2003/0035208 A1 | 2/2003 | Engelhardt | |
| 2003/0103263 A1 | 6/2003 | Engelhardt et al. | |
| 2003/0214707 A1 | 11/2003 | Engelhardt | |

FOREIGN PATENT DOCUMENTS

| | | |
|---|---|---|
| GB | 2 184 321 A | 6/1987 |
| GB | 2 260 200 A | 4/1993 |
| JP | 2-188711 | 7/1990 |
| JP | 7-146448 | 6/1995 |
| JP | 7-333506 | 12/1995 |
| JP | 10-68901 | 3/1998 |
| JP | 2001-356256 | 12/2001 |
| JP | 2002-228933 | 8/2002 |
| JP | 2003-172878 | 6/2003 |
| WO | WO 98/52086 | 11/1998 |
| WO | WO 02/103433 A2 | 12/2002 |
| WO | WO 03/050590 A1 | 6/2003 |

* cited by examiner

*Primary Examiner*—Kevin Pyo
(74) *Attorney, Agent, or Firm*—Scully, Scott, Murphy & Presser, P.C.

(57) ABSTRACT

Compact design is achieved to minimize blocking of the field of view of a stereomicroscope apparatus. Furthermore, astigmatism is decreased to produce a high-quality image. An optical-scanning microscope apparatus includes a light source, a light-transmitting member for transmitting light from the light source, an apparatus main body for illuminating a subject with the light transmitted by the light-transmitting member, and a photodetector for detecting return light returning from the subject via the apparatus main body and the light-transmitting member. The apparatus main body includes a collimating optical system for converting the light transmitted by the light-transmitting member into collimated light, a scanning mirror for deflecting the collimated light emitted from the collimating optical system at a deflection angle smaller than 90° to scan the light over the subject, a focusing optical system for focusing the light scanned by the scanning mirror onto the subject, and a pupil-projection optical system disposed between the focusing optical system and the above-described scanning mirror.

33 Claims, 10 Drawing Sheets

OPTICAL-SCANNING MICROSCOPE APPARATUS

BACKGROUND OF THE INVENTION

1. Field of the Invention

The present invention relates to optical-scanning microscope apparatuses.

This application is based on Japanese Patent Application No. 2004-204920, the content of which is incorporated herein by reference.

2. Description of Related Art

Optical-scanning microscope apparatuses with known structures for displaying a magnified view of a subject for examination are described in Japanese Unexamined Patent Application Publication No. 2003-172878 (see, for example, paragraph 0042 and FIG. 2) and Japanese Unexamined Patent Application Publication No. 2001-356256 (see, for example, paragraph 0020 and FIG. 2). The optical-scanning microscope apparatuses described in these publications each include a relatively large microscope main body provided with a movable objective lens.

A typical two-dimensional scanner apparatus used in optical-scanning microscopes includes two galvanometer mirrors, each of which is rocked while deflecting light with a deflection angle of 90° to scan the light two-dimensionally (see, for example, FIG. 2 of Japanese Unexamined Patent Application Publication No. Hei-10-68901). In a two-dimensional scanner apparatus using a standard proximity galvanometer mirror unit including two galvanometer mirrors, such as the scanner apparatus disclosed in the above-described Unexamined Patent Application Publication No. Hei-10-68901, the deflection angle of each of the galvanometer mirrors is generally set to 90° to substantially match the scanning direction of the scanner apparatus with the deflection direction of each of the galvanometer mirrors.

BRIEF SUMMARY OF THE INVENTION

The present invention provides an optical-scanning microscope apparatus including: a light source; a light-transmitting member for transmitting light from the light source; an apparatus main body for illuminating a subject with the light transmitted by the light-transmitting member; and a photodetector for detecting return light returning from the subject via the apparatus main body and the light-transmitting member. The apparatus main body includes: a collimating optical system for converting the light transmitted by the light-transmitting member into collimated light; a scanning mirror for deflecting the collimated light emitted from the collimating optical system at a deflection angle smaller than 90° to scan the light over the subject; a focusing optical system for focusing the light scanned by the scanning mirror onto the subject; and a pupil-projection optical system disposed between the focusing optical system and the above-described scanning mirror.

According to the present invention, light emitted from the light source is transmitted to the apparatus main body via the light-transmitting member. The light is then radiated onto the subject from the apparatus main body. Return light emitted from the subject returns via the apparatus main body and the light-transmitting member to the photodetector for detection by the photodetector. In the apparatus main body, light transmitted from the light source via the light-transmitting member is converted into collimated light by the collimating optical system and deflected by the scanning mirror for scanning by changing the deflection angle. The light scanned by the scanning mirror is formed into an intermediate image by the pupil-projection optical system and focused onto the subject by the focusing optical system. In the subject, return light including fluorescence or reflected light is generated. The return light generated in the subject returns to the apparatus main body via the focusing optical system and is focused onto the light-transmitting member by the collimating optical system via the pupil-projection optical system and the scanning mirror. The return light is then transmitted via the light-transmitting member, is separated by a light-splitting device such as a dichroic mirror, and is finally guided to the photodetector.

In this case, the scanning mirror deflects the collimated light from the collimating optical system into the pupil-projection optical system at a deflection angle smaller than 90° in the apparatus main body. Hence, astigmatism generated in the scanning mirror is suppressed. This enhances the image quality of an image of return light detected by the photodetector. Furthermore, if the scanning mirror is a proximity galvanometer mirror, in order to deflect light coming from the horizontal direction with respect to the apparatus main body towards the subject, which is positioned downward, it is necessary to first deflect the light substantially in the horizontal direction and then re-deflect the light downward. Therefore, the apparatus main body needs to have a certain width dimension in the direction perpendicular to the direction in which light is radiated onto the subject, i.e., the horizontal direction in this case. According to the present invention, because the deflection angle by the scanning mirror is set to an angle smaller than 90°, the width dimension of the apparatus main body can be reduced compared with a case where the deflection angle is set to 90°. Thus, the field of view of the stereomicroscope is prevented from being blocked.

In the above-described invention, it is preferable that the optical-scanning microscope apparatus further include a reference member for mounting the collimating optical system, the scanning mirror, and the pupil-projection optical system.

Because optical components are mounted on the same reference member, assembly of the optical components and adjustments, including optical-axis adjustment, can be carried out easily. Furthermore, for the same reason, the assembly precision of the optical components can be enhanced.

Furthermore, in the above-described invention, it is preferable that the reference member include a mounting surface on which the scanning mirror is mounted such that a deflection angle smaller than 90° is achieved at an origin thereof.

Since the mounting surface can be formed with high processing accuracy, the assembly precision can be enhanced. Furthermore, optical-axis adjustment needs only fine adjustment.

Furthermore, in the above-described invention, the optical-scanning microscope apparatus may further include a scanning-direction indicator denoting a direction of scanning by the scanning mirror.

If light is deflected at a deflection angle of 90° by the scanning mirror, it is possible to match the width direction and the length direction of the apparatus main body with the direction of scanning by the scanning mirror. On the other hand, deflection of light by the scanning mirror with an angle smaller than 90° makes it difficult to match the width direction and the length direction of the apparatus main body with the direction of scanning by the scanning mirror. To overcome this drawback, a scanning-direction indicator may

DETAILED DESCRIPTION OF THE INVENTION

An optical-scanning microscope apparatus according to one embodiment of the present invention will now be described with reference to FIGS. 1 to 3.

Figure 1:
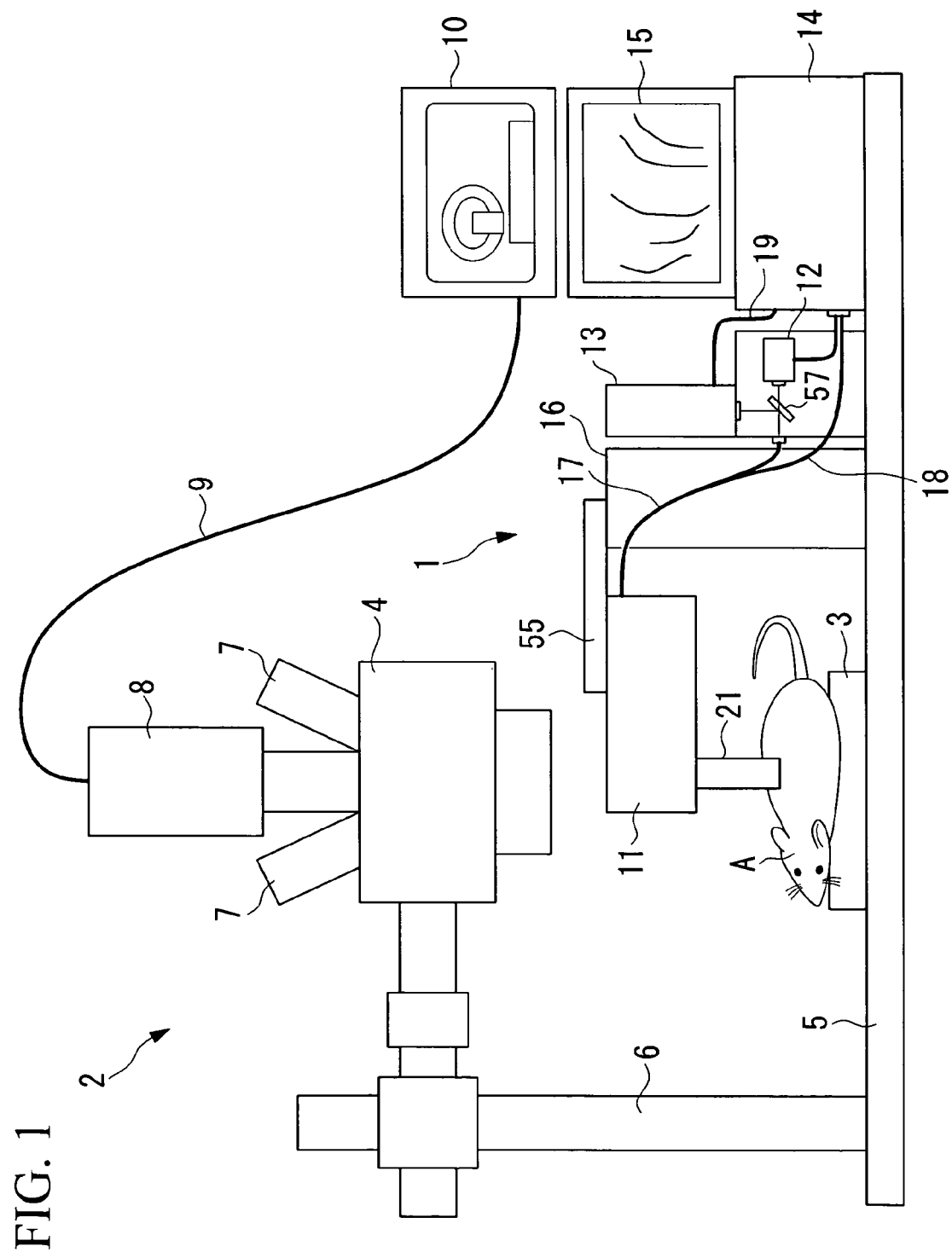
FIG. 1 is a schematic view of a microscope examination system including an optical-scanning microscope apparatus according to a first embodiment of the present invention.

An optical-scanning microscope apparatus 1 according to this embodiment is included in a microscope examination system 2 shown in FIG. 1. Referring to FIG. 1, the microscope examination system 2 includes a stage 3 on which a subject A, such as a small laboratory animal, is placed, the optical-scanning microscope apparatus 1 according to this embodiment arranged above the stage 3, and a stereomicroscope apparatus 4 arranged above the optical-scanning microscope apparatus 1.

The stereomicroscope apparatus 4 is provided so as to be vertically movable on a support stand 6 extending upward from a base 5 having the stage 3 thereon, and includes eyepiece sections 7 for observing the subject A with a relatively small magnification and a CCD camera 8. The CCD camera 8 is connected to a first monitor 10 with a cable 9 to allow an acquired image to be displayed on the first monitor 10.

As shown in FIG. 1, the optical-scanning microscope apparatus 1 according to this embodiment includes a microscope main body 11, a light source 12 connected to the microscope main body 11, a photodetector 13, a control apparatus 14, and a second monitor 15.

The microscope main body 11 is also provided on a support stand 16 extending upward from the base 5 such that the microscope main body 11 is vertically movable and tiltable at any angle. The microscope main body 11 is connected to the light source 12 with an optical fiber (light-transmitting member) 17. Furthermore, the microscope main body 11 and the control apparatus 14 are connected with a cable 18, and the photodetector 13 and the control apparatus 14 are connected with a cable 19. Images subjected to image processing in the control apparatus 14 are displayed on the second monitor 15.

Figure 2:
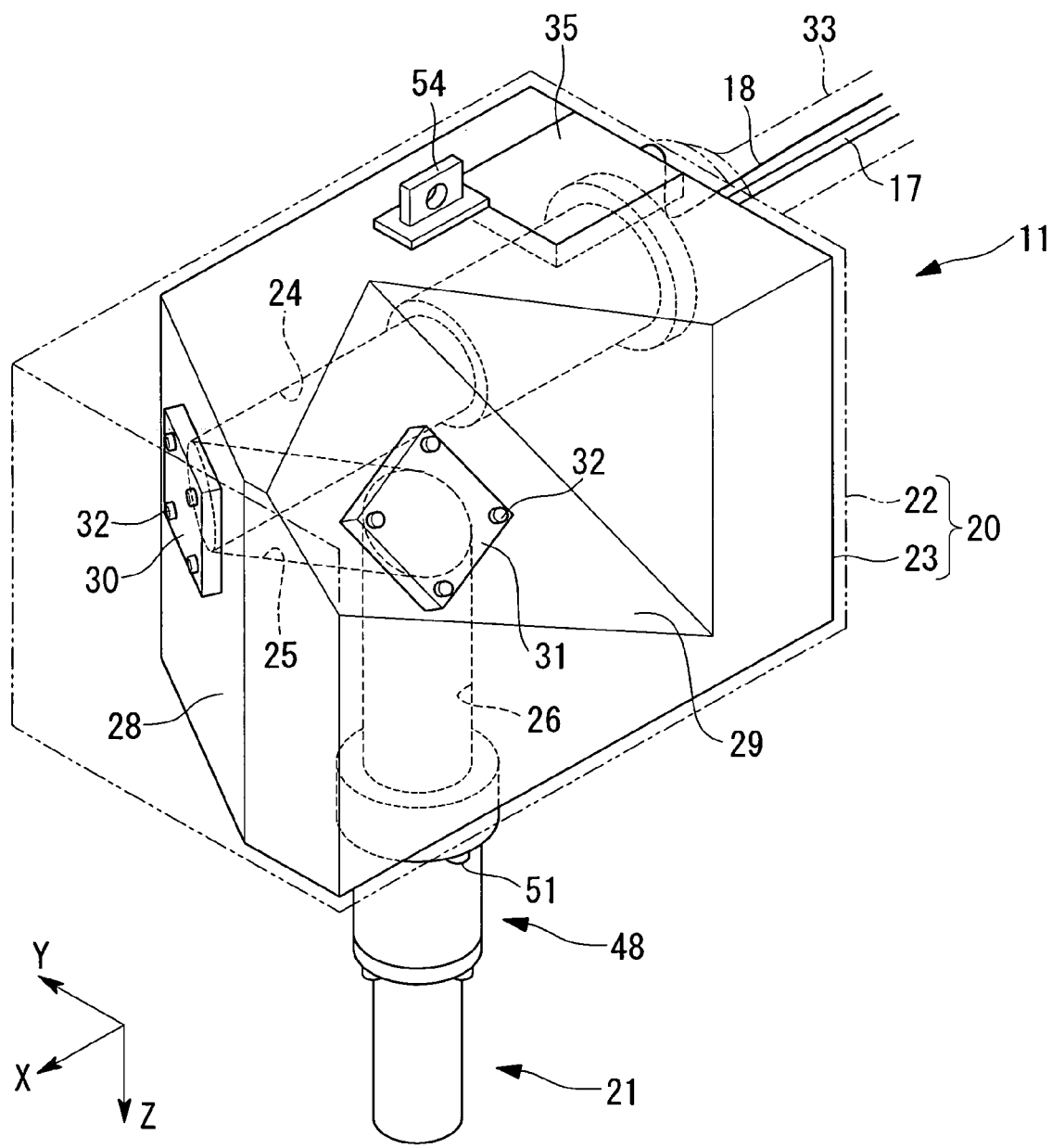
FIG. 2 is a perspective view of a schematic structure of the optical-scanning microscope apparatus according to the first embodiment of the present invention.
Figure 3:
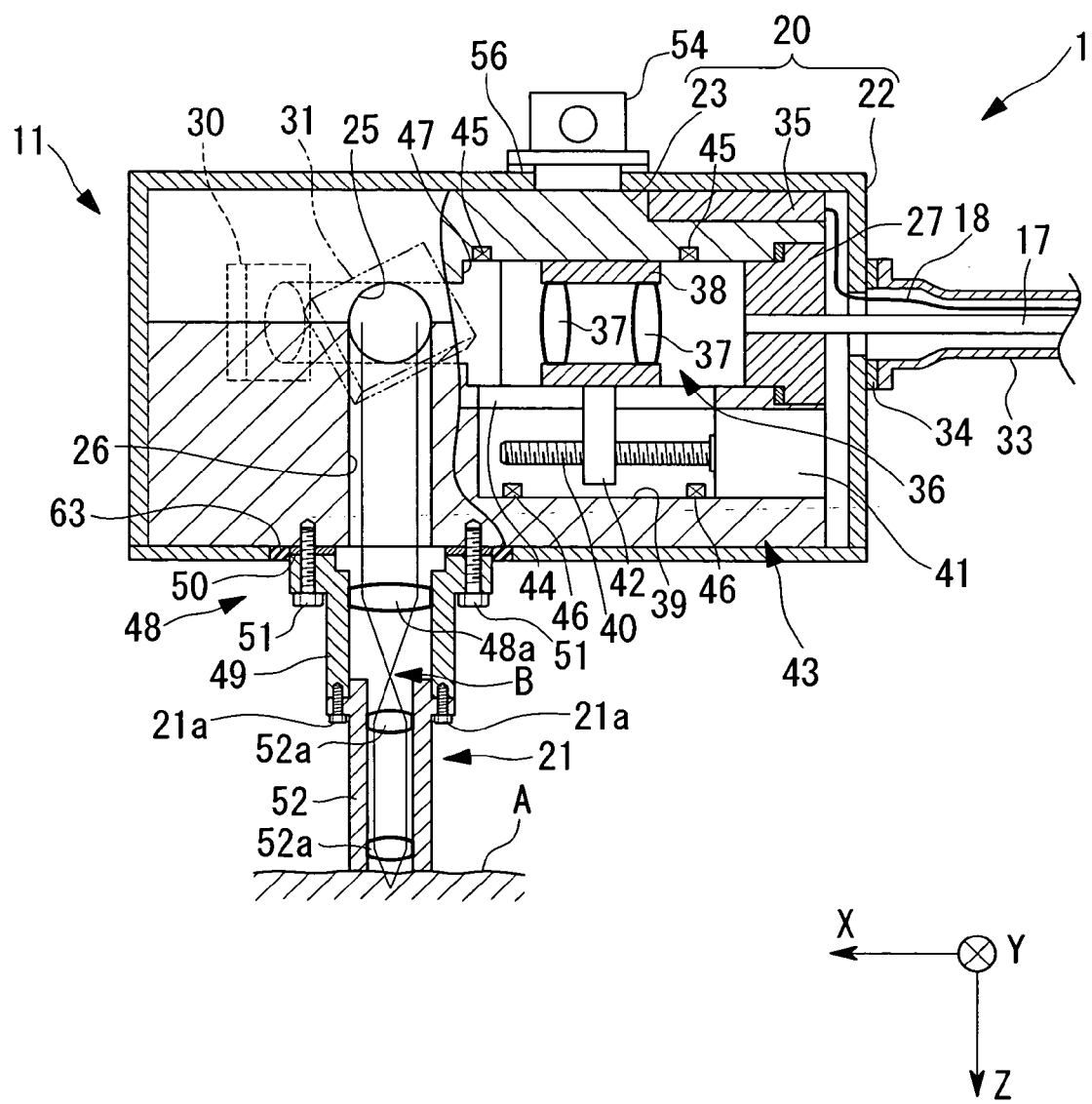
FIG. 3 is a longitudinal cross-sectional view of the internal structure of the optical-scanning microscope apparatus shown in FIG. 2.

Referring to FIGS. 2 and 3, the microscope main body 11 includes a casing 20 connected to one end of the optical fiber 17 and an objective-lens unit (focusing optical system) 21 mounted on the casing 20.

The casing 20 includes a covering member 22 and a reference member 23 secured in the covering member 22. The reference member 23 functions as a base for securing various members to be described later, such as a collimating optical system, a scanning mirror, and a pupil-projection optical system, or for supporting such members in a slidable manner.

Figure 4:
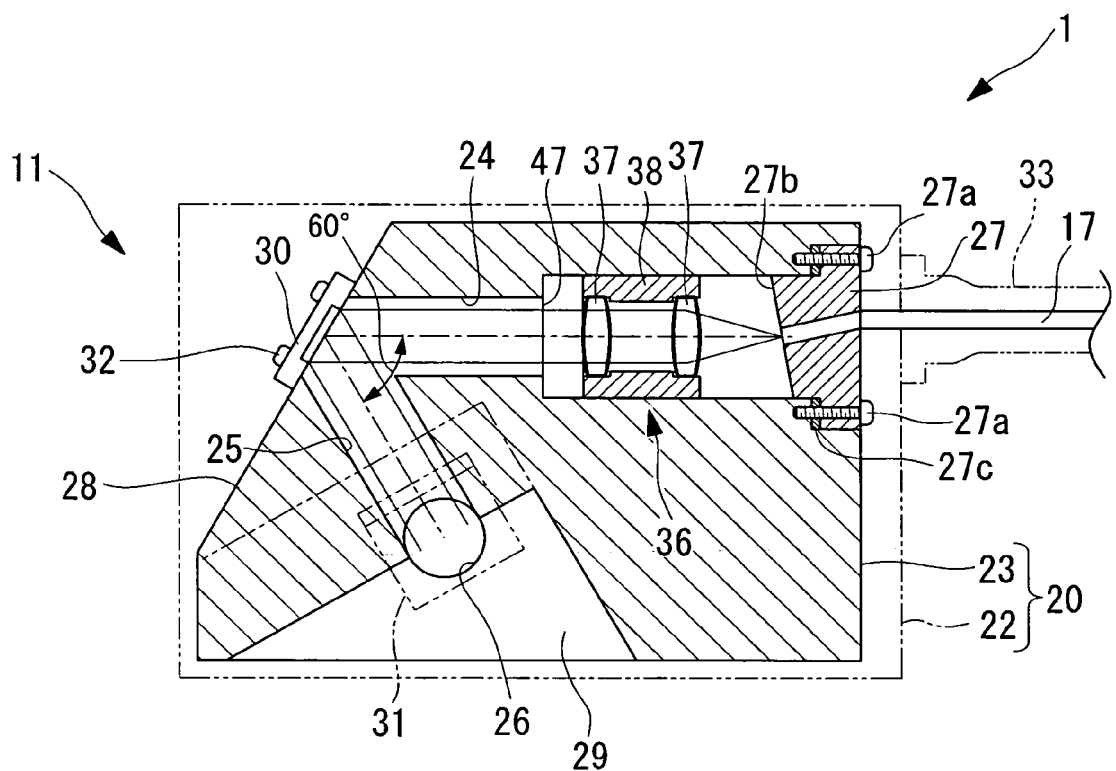
FIG. 4 is a plan cross-sectional view of the internal structure of the optical-scanning microscope apparatus shown in FIG. 2.
Figure 4:
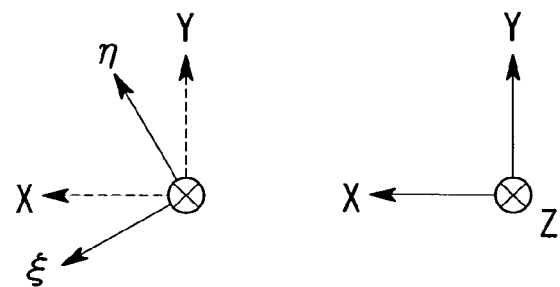

The reference member 23 is a substantially rectangular block, and includes a first through-hole 24 in its longitudinal direction (X direction), a second through-hole 25 intersecting with the first through-hole 24, and a third through-hole 26 intersecting with the second through-hole 25. Referring to FIG. 4, a ferrule 27 coupled with an end of the optical fiber 17 is secured with screws 27a to the opening at one end of the first through-hole 24. The ferrule 27 has an end surface 27b cut obliquely to form a light emission surface of the optical fiber 17, which is oblique relative to the length direction. This prevents light in the optical fiber 17 reflected at the light emission surface from returning to the photodetector 13 to be described later. The position and angle of the ferrule 27 can easily be finely adjusted by adjusting a shim plate 27c interposed, as required, between the ferrule 27 and the reference member 23.

As shown in FIGS. 2 and 4, the other end of the first through-hole 24 forms an opening on a first tilted surface 28 truncated along the vertical direction (Z direction) at an angle of smaller than 45°, for example, an angle of 30°, with respect to the Y direction in a corner at one end in the longitudinal direction (X direction) of the reference member 23, which is a substantially rectangular block. One end of the second through-hole 25 also forms an opening on the first tilted surface 28, more specifically, at the same position where the opening of the first through-hole 24 is formed. As shown in FIG. 4, the second through-hole 25 intersects with the first through-hole 24 at an angle smaller than 90°, for example, an angle of 60°. The other end of the second through-hole 25 forms an opening on a second tilted surface 29 truncated at an angle of 45° to the longitudinal direction of the second through-hole 25 and the vertical direction (Z direction). Furthermore, one end of the third through-hole 26 forms an opening on the second tilted surface 29, more specifically, at the same position where the opening of the second through-hole 25 is formed. The third through-hole 26 extends downward (in the Z direction), intersecting with the second through-hole 25 at an angle of about 90°.

A first galvanometer mirror (scanning mirror) 30 and a second galvanometer mirror (scanning mirror) 31 are secured on the first and second tilted surfaces 28 and 29, respectively, with screws 32 to cover the openings of the through-holes 24 to 26. The galvanometer mirrors 30 and 31 can be finely adjusted in directions parallel to their respective mirror surfaces. Each of the galvanometer mirrors 30 and 31 is a one-dimensional galvanometer mirror rockable about a single axis. More specifically, the first galvanometer mirror 30 rocks about an axis along the Z direction, and the second galvanometer mirror 31 rocks about an axis along the XY flat surface.

These first and second galvanometer mirrors 30 and 31 constitute a proximity galvanometer mirror unit. That is to say, a proximity galvanometer mirror unit has at least two mirrors which are disposed in proximity and which oppose to each other, and has the function of two-dimensionally scan the light.

Figure 12A:
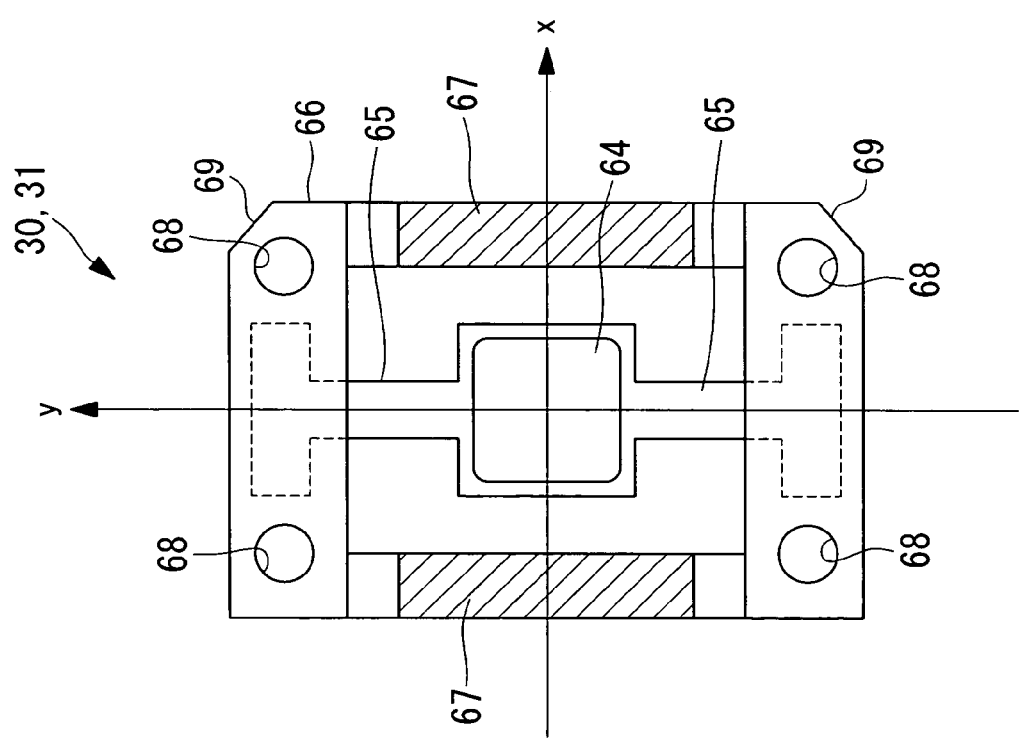
FIGS. 12A and 12B are a plan view and a side elevational view, respectively, of one example of a scanning mirror.
Figure 12B:
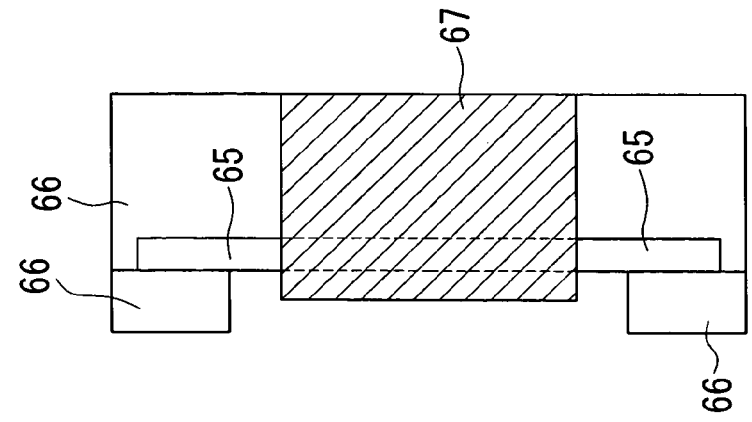

The scanning mirrors 30 and 31 include units shown in FIGS. 12A and 12B if they are realized by, for example, electromagnetically driven micromachined mirrors. FIG. 12A is a plan view and FIG. 12B is a side elevational view. More specifically, each of the scanning mirrors 30 and 31 includes a mirror main body 64 for reflecting light, a mirror frame 66 for mounting the mirror main body 64 via hinge sections 65, and a unit having magnets 67 for generating a magnetic field. In the example of FIG. 12A, the mirror main body 64 is rocked about the y axis to scan light within a desired range in the X direction. The mirror frame 66 is provided with holes 68 for adjusting screws. When the mirror frame 66 is to be mounted on the tilted surfaces 28 and 29 of the reference member 23, the position of the mirror main body 64 can be finely adjusted with respect to the reference member 23. Furthermore, the mirror frame 66 is provided with chamfered sections 69 such that it can be compactly accommodated in the covering member 22.

Referring back to FIGS. 2 to 4, the tilted surfaces 28 and 29 are processed with high accuracy so that the deflection angle at the origins of the first and second galvanometer mirrors 30 and 31 can be set accurately. As a result, the positions and angles of the galvanometer mirrors 30 and 31 can easily be finely adjusted by loosening the screws 32 to adjust, as required, the thickness of a shim plate (not shown in the figure) interposed between the galvanometer mirror 30 and the tilted surface 28 and the thickness of a shim plate interposed between the galvanometer mirror 31 and the tilted surface 29.

Furthermore, the above-described mechanism for adjusting the position of a scanning mirror allows the scanning mirror to be replaced if the scanning mirror becomes defective. This enables the serviceable life span of the apparatus main body to be extended.

The optical fiber 17 is covered with a sheath 33. The opening at an end of the sheath 33 is coupled with the casing 20 in a sealed manner with a watertight seal 34. Furthermore, the sheath 33 contains the cable 18 for connecting devices in the microscope main body 11, such as the first and second galvanometer mirrors 30 and 31 and a stepper motor, to the control apparatus 14. A connector 35 is mounted on an end of the cable 18, and is connected to a terminal (not shown in the figure) provided on the reference member 23 to relay signals.

In the first through-hole 24 of the reference member 23, a collimating lens unit 36 is supported so as to be movable along the length direction of the first through-hole 24. The collimating lens unit 36 includes at least one collimating lens 37 in a lens frame 38.

The reference member 23 contains an actuator 43, which is composed of a lead screw 40 extending in parallel with the first through-hole 24, disposed in a hole 39 provided in parallel with the first through-hole 24; a stepper motor 41 for rotating the lead screw 40 about the longitudinal axis; and a nut 42 screwed around the lead screw 40 and translated in the direction along the first through-hole 24 with the rotation of the lead screw 40.

Instead of the stepper motor 41, another driving device, such as a DC motor with an encoder, may be used.

The hole 39 and the first through-hole 24 communicate with each other via a communicating section 44, to which the nut 42 and the lens frame 38 are connected.

The first through-hole 24 contains working-range detectors 45 for detecting the lens frame 38 when it reaches either end of the working range of the lens frame 38. Furthermore, in the hole 39 containing the lead screw 40, working-range detectors 46 for detecting the nut 42 are provided one at each end of the working range of the nut 42. Either one of the working-range detectors 45 and 46 may be omitted.

In addition, an abutting surface 47 on which an end surface of the lens frame 38 abuts is provided at one end of the first through-hole 24. With the abutting surface 47, the origin of the lens frame 38 can be reproduced correctly in the following manner. First, the lead screw 40 is rotated in one direction by the operation of the stepper motor 41 until the end surface of the lens frame 38 is in contact with the abutting surface 47. Then, the lead screw 40 is further rotated to cause the stepper motor 41 to lose synchronization. Thereafter, the lead screw 40 is rotated in the reverse direction by a predetermined rotational angle.

As shown in FIG. 3, the width dimension of the microscope main body 11 can be reduced by arranging the actuator 43 in a space defined by inner surfaces of the first galvanometer mirror 30, the second galvanometer mirror 31, and a pupil-projection-lens unit 48 in the microscope main body 11. Because of this, the microscope main body 11 does not block the field of view of the stereomicroscope apparatus 4 used in combination with the optical-scanning microscope apparatus 1.

Furthermore, the pupil-projection-lens unit 48 including a pupil projection lens 48a is secured with a bracket 49 in the opening at one end of the third through-hole 26. The pupil-projection-lens unit 48 focuses a laser beam deflected by the second galvanometer mirror 31 onto an intermediate image position B. This prevents the laser beam from diverging as off-axis light, and furthermore achieves a small beam diameter to allow the beam to be guided in the thin objective-lens unit 21.

Furthermore, the bracket 49 of the pupil-projection-lens unit 48 is secured by screws 51 on the reference member 23 unit 48 with a shim plate 50 interposed between the bracket 49 and the reference member 23. The position and angle of the bracket 49 can easily be adjusted by changing the thickness of the shim plate 50 as required.

After the pupil-projection-lens unit 48 is mounted on the microscope main body 11, the covering member 22 can be mounted on the reference member 23 via a watertight seal 63 to achieve watertight sealing in the microscope main body 11.

The objective-lens unit 21 includes a bracket 52 having a fitting section to be engaged with the bracket 49 of the pupil-projection-lens unit 48, and contains at least one objective lens 52a. The objective lens 52a re-focuses the intermediate image formed by the pupil-projection-lens unit 48 onto the subject A. The objective-lens unit 21 is fixed on the pupil-projection-lens unit 48 with screws 21a.

Furthermore, in a case where a plurality of objective lens units 21 is provided, an identification-code section (not shown in the figure) specific to each of the objective-lens units 21 may be formed by truncating part of the end surface of the bracket 52, i.e., the end surface adjacent to the bracket 49, so that the identification-code section of each objective-lens unit 21 engaged with the bracket 49 can be read out.

In addition, a detachment sensor (not shown in the figure) may be provided in the casing 20 to detect whether the objective-lens unit 21 is mounted.

Deflecting light with the galvanometer mirrors 30 and 31 as described above allows the first through-hole 24 to be arranged substantially horizontally when the objective-lens unit 21 is arranged in the vertical direction. This enables the distance from an end of the objective-lens unit 21 to the top end of the casing 20 to be reduced. Consequently, the distance from the stereomicroscope apparatus 4 arranged above the casing 20 to the subject A can be shortened.

Figure 5:
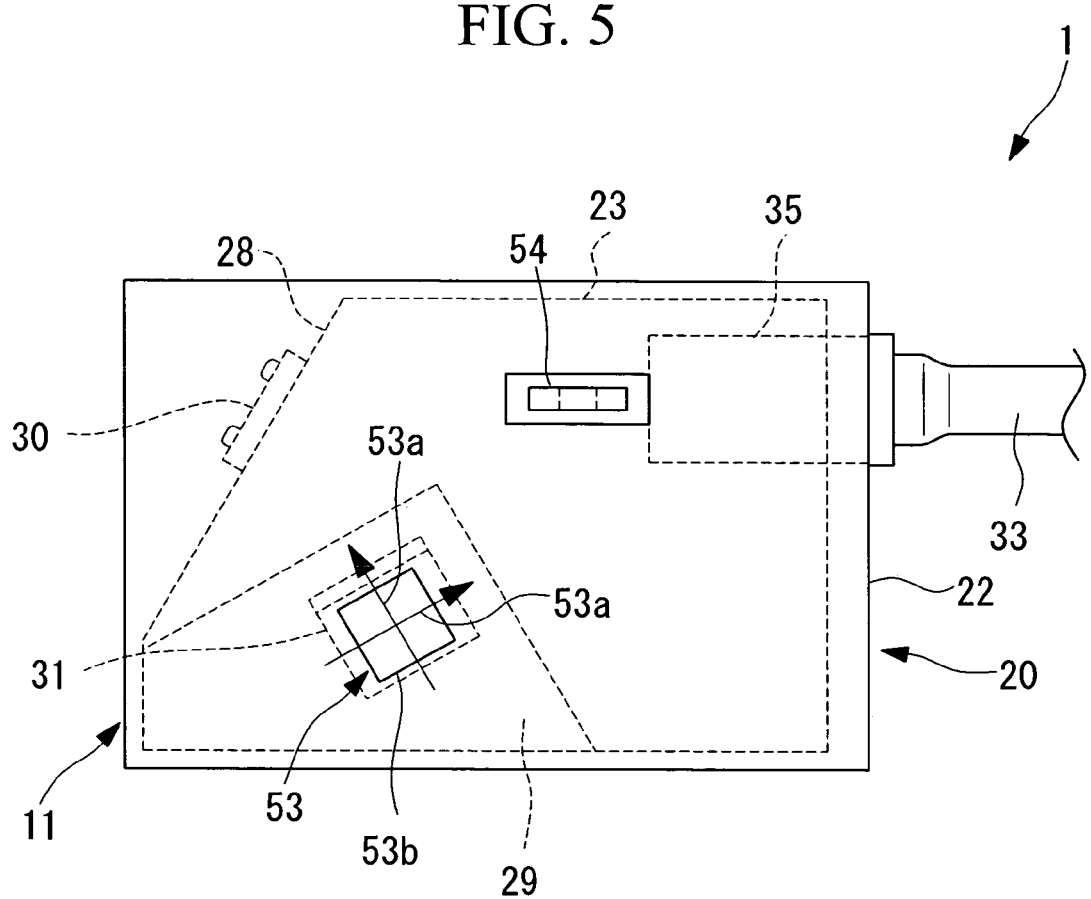
FIG. 5 is a plan view of the optical-scanning microscope apparatus shown in FIG. 2.

Referring to FIG. 5, a scanning-direction indicator 53 indicating the scanning directions of the galvanometer mirrors 30 and 31 is marked on the top surface of the covering member 22 covering the reference member 23. Because the second galvanometer mirror 31 is tilted with respect to the X direction and the Y direction, the scanning direction of the second galvanometer mirror 31 is also at an angle with respect to the microscope main body 11. The scanning-direction indicator 53 includes, for example, arrows 53a representing two scanning directions and a rectangle 53b representing a rough scanning range. An operator of the microscope main body 11 can confirm the direction from which he or she is observing the subject A by glancing at this scanning-direction indicator 53 on the external surface of the microscope main body 11.

A mounting portion 54 is used to mount the microscope main body 11 on an arm 55 extending from the support stand 16. The mounting portion 54 is also secured on the reference member 23 with a watertight seal 56 interposed between itself and the covering member 22.

Referring back to FIG. 1, the light source 12 is, for example, a laser light source capable of selectively emitting excitation light having a plurality of wavelengths. A selecting device for selecting the wavelength of the light source 12 is included in the control apparatus 14. The photodetector 13 is, for example, a photomultiplier tube (PMT). It detects fluorescence separated from return light by a dichroic mirror 57 on the optical path from the light source 12 and sends the fluorescence to the control apparatus 14 as an image signal.

The control apparatus 14 outputs a command for changing the wavelength of emission light to the light source 12. Furthermore, the control apparatus 14 outputs an operation command to the stepper motor 41 of the microscope main body 11 and also outputs a deflection-angle command to the galvanometer mirrors 30 and 31. In addition, the control apparatus 14 receives from the microscope main body 11 a signal output from the working-range detectors 45 and 46. The control apparatus 14 also receives information about an acquired image from the photodetector 13.

The operation of the optical-scanning microscope apparatus 1 with the above-described structure, according to this embodiment, will be described below.

Referring again to FIG. 1, observation of the subject A with the above-described microscope examination system 2 starts by immobilizing the subject A, such as a small laboratory animal, including rats and mice, on the stage 3. Next, the skin is cut open to expose internal biological tissues of the subject A while an image of the examination site is being displayed on the first monitor 10 using the stereomicroscope apparatus 4 arrange above the stage 3. At this time, the microscope main body 11 of the optical-scanning microscope apparatus 1 is disposed outside the field of view of the stereomicroscope apparatus 4.

In the optical-scanning microscope apparatus 1, the appropriate objective-lens unit 21 for achieving a desired magnification is coupled with the pupil-projection-lens unit 48. The objective-lens unit 21 and the pupil-projection-lens unit 48 are sealed with a member such as an O-ring (not shown in the figure) to prevent water entering inside.

With these preparations, the microscope main body 11 of the optical-scanning microscope apparatus 1 is moved between the stereomicroscope apparatus 4 and the subject A.

According to the optical-scanning microscope apparatus 1 of this embodiment, the first through-hole 24 for guiding light and the third through-hole 26 are arranged at an angle of 90° relative to each other via the galvanometer mirrors 30 and 31. As a result, when the third through-hole 26 and the subsequent objective-lens unit 21 are arranged in the vertical direction, the first through-hole 24 can be arranged substantially horizontally. This means that a laser beam onto the subject A can be guided from the horizontal direction rather than the vertical direction. This allows the height of the microscope main body 11 to be reduced. Consequently, the distance between the stereomicroscope apparatus 4 and the subject A can be shortened.

Furthermore, the operator can confirm the scanning-direction indicator 53 marked on the top surface of the covering member 22 of the casing 20 to learn how the subject A has been scanned to produce the current image. In this manner, the operator can adjust the angle of the microscope main body 11 in the horizontal direction to produce a desired image of the subject A.

For observation, the lower end of the objective-lens unit 21 provided on the microscope main body 11 is pressed onto the exposed examination site of the subject A. As a result, even if pulsation occurs in the subject A, the end of the objective-lens unit 21 restrains the pulsation at the examination site to prevent the image from shaking.

The control apparatus 14, the light source 12, the photodetector 13, and other units are operated in the above-described situation to allow the control apparatus 14 to issue a wavelength command to the light source 12, an operation command to the actuator 43, and a deflection-angle command to the galvanometer mirrors 30 and 31.

When a wavelength command for the light source 12 is sent to the light source 12, the light source 12 outputs a laser beam with a specified wavelength using a wavelength adjusting device (not shown in the figure).

The laser beam emitted from the light source 12 is transmitted into the casing 20 of the microscope main body 11 via the optical fiber 17. Referring again to FIG. 4, the end of the optical fiber 17 is secured on the reference member 23 of the casing 20 with the ferrule 27, and the laser beam is emitted from the end surface of the optical fiber 17 into the first through-hole 24. Since the end surface of the optical fiber 17 is cut at a sloping angle, light reflected at the end surface is prevented from returning through the optical fiber 17 to the photodetector 13.

The laser beam emitted from the end of the optical fiber 17 is converted into collimated light through the collimating lens unit 36 and is incident on the first galvanometer mirror 30. The first galvanometer mirror 30 is arranged at an angle larger than 45°, for example, an angle of 60° relative to the optical axis (X direction) of the collimating lens unit 36. As a result, light input from the collimating lens unit 36 is deflected at a deflection angle of 60° and is output. Furthermore, the first galvanometer mirror 30 scans the laser beam, for example, in the ξ direction shown in FIG. 4 according to the deflection-angle command from the control apparatus 14. In addition, the second galvanometer mirror 31 scans the laser beam, for example, in the η direction shown in FIG. 4 according to the deflection-angle command from the control apparatus 14. As a result, when the laser beam deflected by the first and second galvanometer mirrors 30 and 31 passes through the pupil-projection-lens unit 48 and the objective-lens unit 21 onto the subject A, the laser beam is scanned two-dimensionally over a predetermined field of view on the subject A.

In this case, according to the optical-scanning microscope apparatus 1 of this embodiment, the following advantages are offered since the first through-hole 24 and the second through-hole 25 intersect at an angle smaller than 90°, for example, an angle of about 60°.

Figure 6:
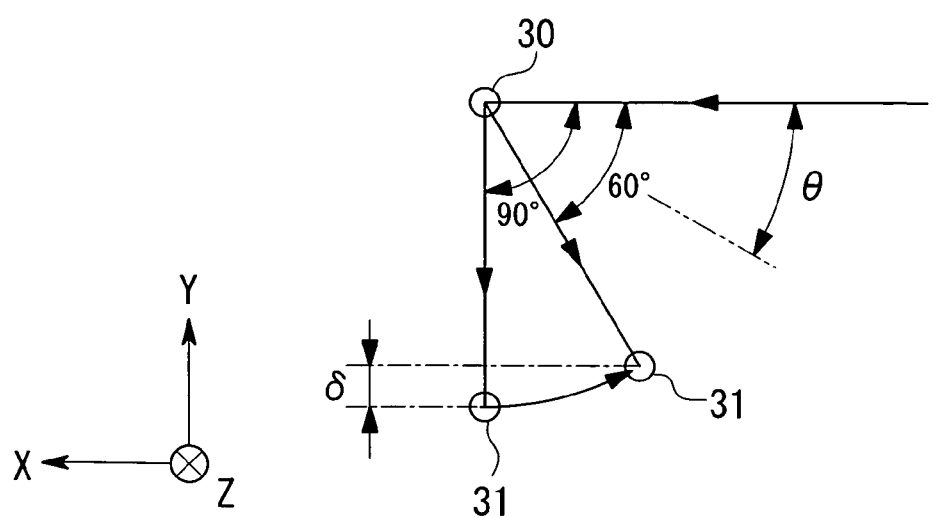
FIG. 6 is a schematic diagram illustrating a change in width dimension depending on the change in the incident angle to a first galvanometer mirror.

First, as shown in FIG. 6, assuming that the distance between the two galvanometer mirrors 30 and 31 is constant, the distance along the Y direction between the galvanometer mirrors 30 and 31 can be made smaller, by the value δ, if the first galvanometer mirror 30 has a deflection angle of 60° than if it has a deflection angle of 90°. Therefore, the dimension of the casing 20 in the Y direction, i.e., the width dimension can be reduced. Consequently, the microscope main body 11 does not block the field of view of the stereomicroscope apparatus 4 significantly. This allows observation to be performed using the optical-scanning microscope apparatus 1 with a high magnification while the examination site is being observed with the stereomicroscope apparatus 4.

Second, as shown in FIG. 6, as the deflection angle of the first galvanometer mirror 30 becomes smaller than 90°, an incident angle θ of light to the first galvanometer mirror 30 becomes smaller, accordingly. More specifically, the incident angle is 45° if the deflection angle is 90°, whereas the incident angle is 30° if the deflection angle is 60°.

Figure 7:
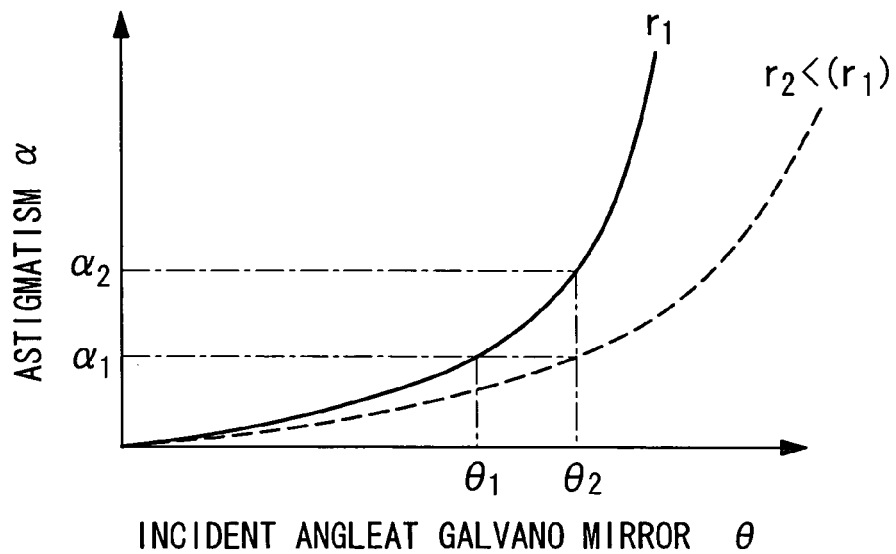
FIG. 7 is a graph depicting the relationship between the incident angle to a galvanometer mirror and astigmatism.

The relationship between the value of the astigmatism α and the incident angle θ to the galvanometer mirrors 30 and 31 is shown in FIG. 7. According to FIG. 7, the larger the incident angle θ, the higher the value of the astigmatism α.

Furthermore, as described above, since the galvanometer mirrors 30 and 31 have a laminated structure of metal and nonmetal materials, the flatness of the mirror surface is poor, i.e., has a predetermined curvature r1, resulting in astigmatism α. As the curvature r of the galvanometer mirrors 30 and 31 becomes larger, the incident angle θ to the galvanometer mirrors 30 and 31 needs to be smaller to obtain the same value of the astigmatism α.

Therefore, an incident angle θ of 30° to the galvanometer mirror 30 allows the astigmatism α to be reduced significantly compared with an incident angle θ of 45°. As a result, the resolution of an acquired image can be prevented from decreasing due to astigmatism α, and thus a clear and high-resolution image can be produced.

Referring to FIGS. 1 to 3, the laser beam deflected at the first and second galvanometer mirrors 30 and 31 is focused as an intermediate image by the pupil-projection-lens unit 48 and then refocused onto the subject A by the objective-lens unit 21. When the laser beam is focused onto the subject A, fluorescence is emitted from the subject A, and the laser beam including the emitted fluorescence returns along the same optical path via the objective-lens unit 21, the pupil-projection-lens unit 48, the second and first galvanometer mirrors 31 and 30, the collimating lens unit 36, and the optical fiber 17. The fluorescence is then separated from the laser beam by the dichroic mirror 57 and detected by the photodetector 13.

When an operation command for the actuator 43 is sent to the stepper motor 41, the nut 42 is moved in the direction along the first through-hole 24 as a result of the lead screw 40 being rotated by the specified rotation angle. When the nut 42 is moved, the lens frame 38 connected to the nut 42 is displaced. The internal collimating lens 37 is also displaced along with the lens frame 38, so that the focal position of the laser beam at an end of the objective-lens unit 21 is adjusted.

Furthermore, when the magnification for examination with the optical-scanning microscope apparatus 1 is to be changed, a magnification is input from an input device that is not shown in the figure. The control apparatus 14 recalculates the amount of travel of the actuator 43 for achieving the input magnification and sends an operation command to the stepper motor 41. As a result, the collimating lens unit 36 is displaced along the optical-axis direction to cause the focal position of the laser beam to change at the end of the objective-lens unit 21.

Furthermore, setting and changing of the focal position can be carried out merely by displacing the collimating lens unit 36 in the casing 20 without having to displace the end of the objective-lens unit 21. This enables continuous observation to be performed while the pulsation of the subject A is restrained. Therefore, a vibration-free, clear image can be acquired.

The arrangement of the actuator 43 is not limited to that described in the above-described embodiment. The above-described embodiment is also applied to a general optical-scanning microscope which includes a light source, a light-transmitting member, a collimating optical system, a scanning mirror, a focusing optical system, a pupil-projection optical system, a photodetector, an actuator, a control apparatus, and a compact, small-diameter focusing optical system.

Although the deflection angle by the first galvanometer mirror 30 is set to 60° in the optical-scanning microscope apparatus 1 according to this embodiment, any deflection angle smaller than 90° (incident angle smaller then 45°) is also effective in reducing astigmatism. Substantially, a deflection angle smaller than 70° is preferable. Furthermore, although the deflection angle should preferably be as close to 0° as possible, it is unavoidable to deflect light at a deflection angle more than 0° due to various geometric restrictions, such as the sizes of the galvanometer mirrors 30 and 31 and the diameter of the optical path.

Figure 8:
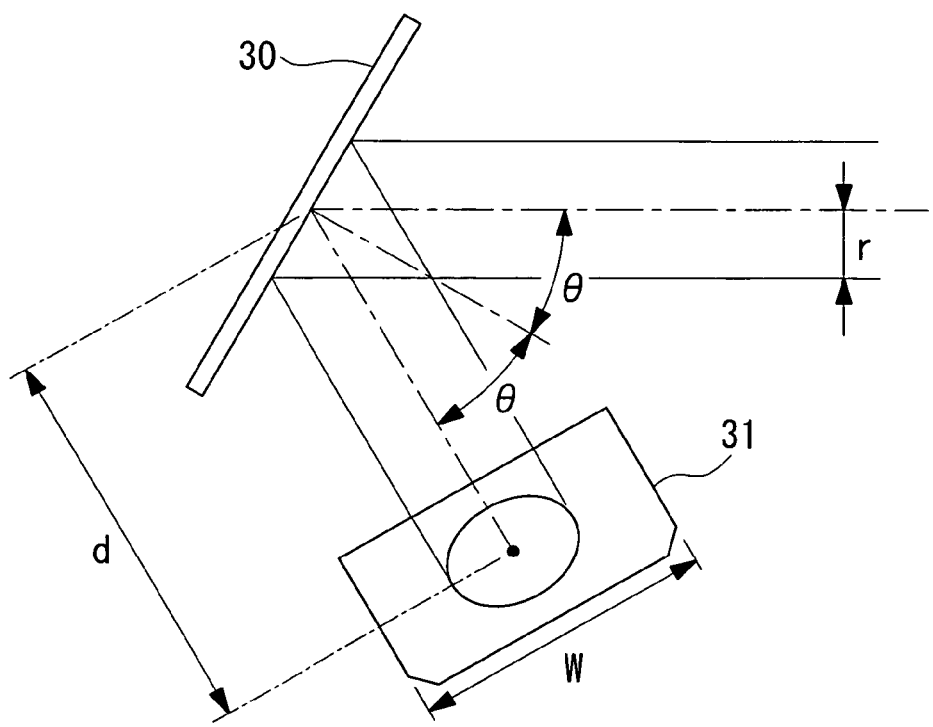
FIG. 8 is a schematic diagram illustrating a geometric restriction on the incident angle to the first galvanometer mirror.

For example, as shown in FIG. 8, to prevent the second galvanometer mirror 31 from overlapping the optical path in the first through-hole 24, the following conditional expression needs to be satisfied:

$$\theta \geq 0.5 \times (\alpha + \sin^{-1}(r/(d^2+w^2/4)^{0.5}))$$

where 2r is the diameter of the optical path in the first through-hole 24, W is the width dimension of the second galvanometer mirror 31, θ is the incident angle in the first galvanometer mirror 30, d is the distance between the first galvanometer mirror 30 and the second galvanometer mirror 31, and $\alpha = \cos^{-1}(d/(d^2+w^2/4)^{0.5})$.

Furthermore, in the above-described embodiment, the deflection angle in the first galvanometer mirror 30 is set to 60°, which is smaller than 90°, and the deflection angle in the second galvanometer mirror 31 is set to about 90°. Instead, the deflection angle in the second galvanometer mirror 31 may be set to an angle smaller than 90°. Although this structure becomes complicated in this case, it is advantageous in reducing the occurrence of astigmatism in each of the galvanometer mirrors 30 and 31.

Furthermore, although the above-described embodiment assumes that light is deflected with the two galvanometer mirrors 30 and 31, three or more galvanometer mirrors may be used to deflect light. In this case, all galvanometer mirrors may have a deflection angle smaller than 90° or at least one of the galvanometer mirrors may have a deflection angle smaller than 90°.

In addition, although in the above-described embodiment, the two one-dimensional galvanometer mirrors 30 and 31 arranged opposed to each other are used to deflect light for two-dimensional scanning, the first galvanometer mirror 30, for example, may be realized by a two-dimensional galvanometer mirror which rocks about two perpendicular axes and the second galvanometer mirror 31 may be realized by a non-scanning stationary mirror. With this structure, the stationary mirror does not need to have a hinge section, which is required with a scanning mirror, and therefore can be made compact. This enables the dimension in the width direction to be further reduced.

Furthermore, when a two-dimensional galvanometer mirror is to be employed, the first through-hole 24 may be made so as to extend obliquely upward at an angle of about 30°, so that the two-dimensional galvanometer mirror may be arranged at the intersection between the first through-hole 24 and the second through-hole 25 extending downward. With this structure, the dimension in the width direction can be made significantly smaller and astigmatism can be reduced.

Figure 9:
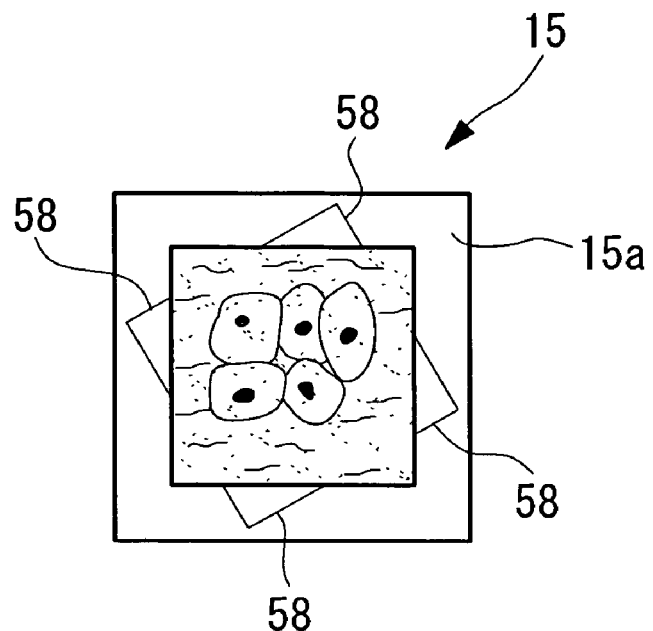
FIG. 9 is a schematic diagram depicting one modification of a display in the scanning direction.
Figure 10:
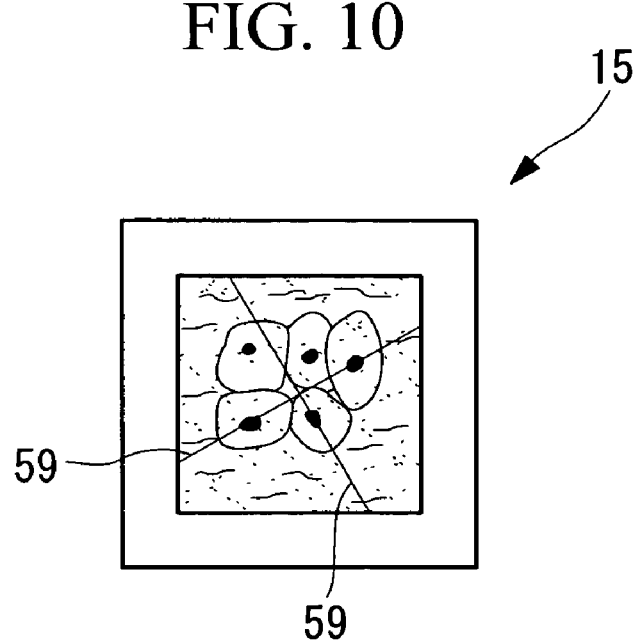
FIG. 10 is a schematic diagram depicting another modification of the display in the scanning direction.

In addition, although the above-described embodiment includes the arrows 53a representing the scanning directions and the rectangle 53b representing the image range, which together constitute the scanning-direction indicator 53 on the top surface of the covering member 22 of the microscope main body 11, scanning directions may be indicated indirectly by providing indication lines 58 denoting the direction of the microscope main body 11 on a frame 15a of the monitor 15, as shown in FIG. 9. Furthermore, as shown in FIG. 10, indication lines 59 denoting the direction of the microscope main body 11 may be drawn on the monitor screen. In addition, these indication lines 59 may be superimposed as an image on an examination image by the optical-scanning microscope apparatus 1. In this case, the indication lines 59 may be designed such that they can be selectively displayed and hidden.

Figure 11:
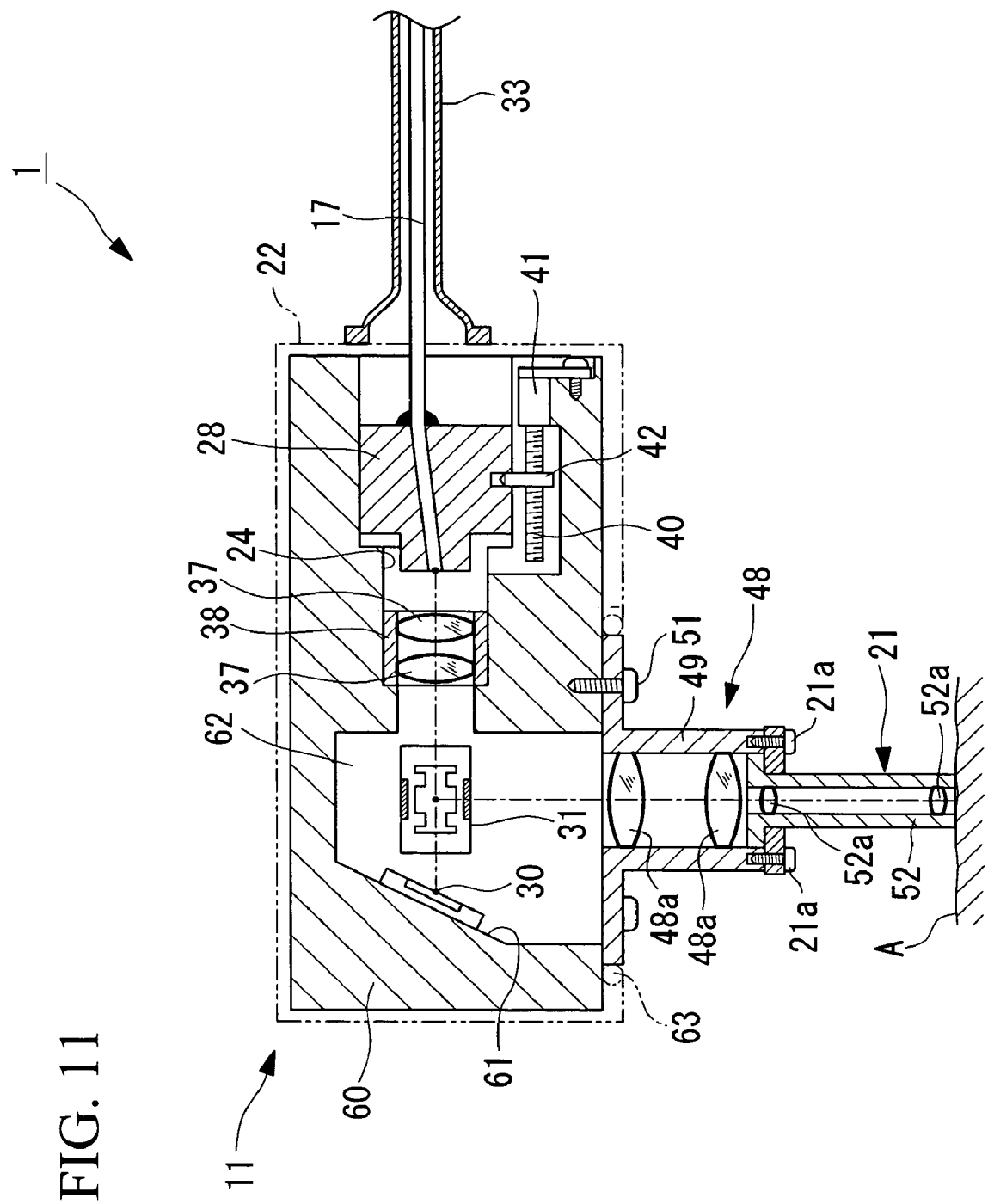
FIG. 11 is a longitudinal cross-sectional view of a modification of the optical-scanning microscope apparatus shown in FIG. 2.

In addition, although in the above-described embodiment the galvanometer mirrors 30 and 31 are mounted on the tilted surfaces 28 and 29 formed on the external surface of the reference member 23, tilted surfaces 61 and 62 may be provided on the inner surface of a reference member 60 and the galvanometer mirrors 30 and 31 may be secured with an adhesive, as shown in FIG. 11. In the above-described embodiment, the optical-scanning microscope apparatus 1 moves the collimating lens unit 36. In the example of FIG. 11, however, the optical-scanning microscope apparatus 1 moves a ferrule 28 supporting the optical fiber 17. With this structure, focal position adjustment is possible while the end surface of the objective-lens unit 21 is maintained in close contact with the subject A, in the same manner as in the above-described embodiment.

Figure 13A:
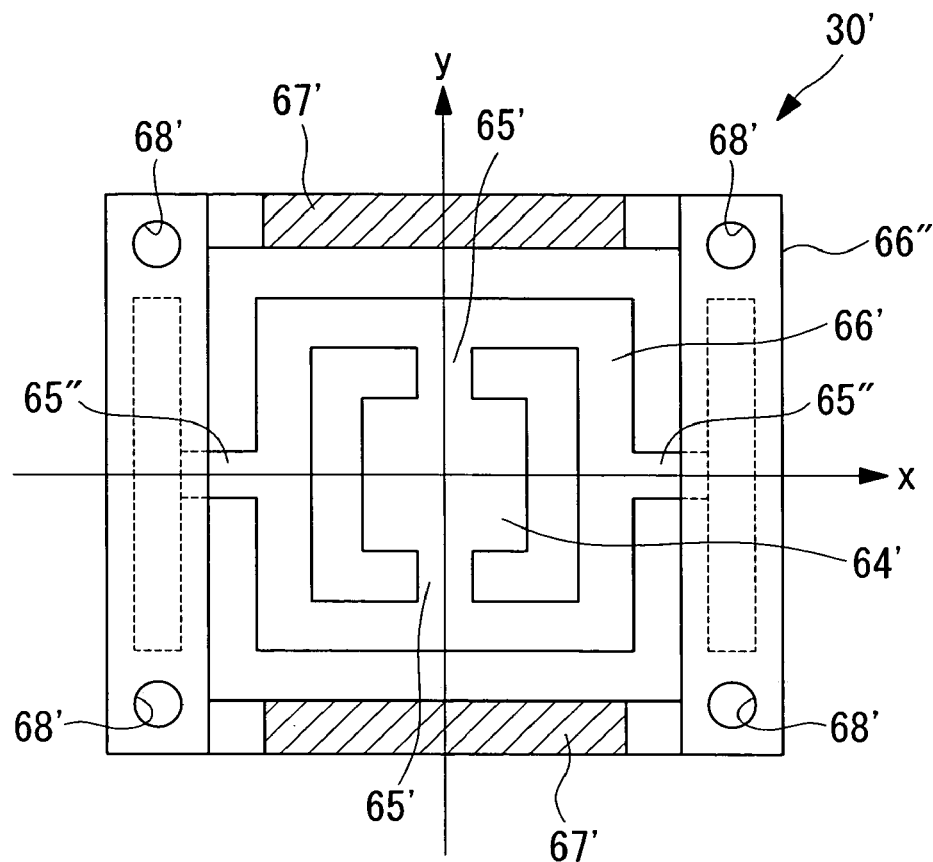
FIGS. 13A and 13B are a plan view and a side elevational view, respectively, of another example of the scanning mirror.
Figure 13B:
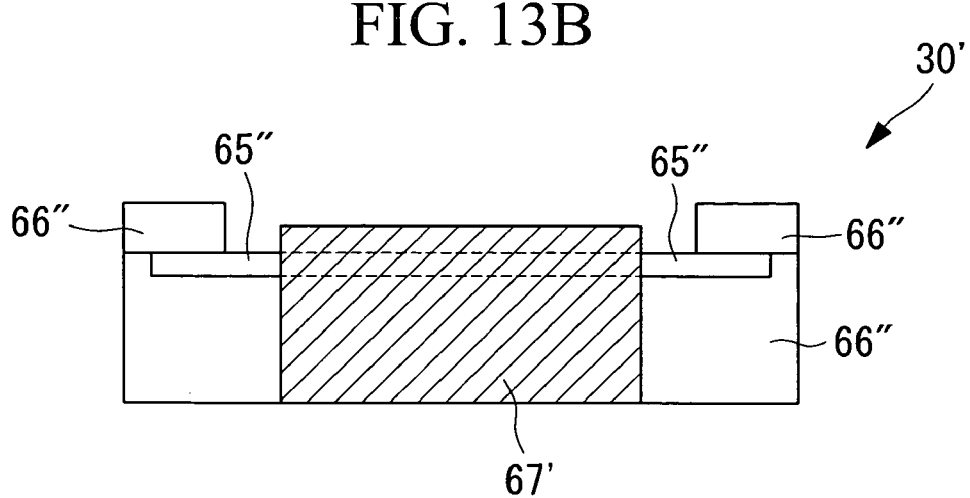

In addition, although in this embodiment the scanning mirrors 30 and 31 are single-axis scanning, electromagnetically driven micromachined mirrors, as shown in FIGS. 12A and 12B, a two-dimensional gimbal mirror unit (two-axis-scanning micromachined mirror) 30' with the structure shown in FIGS. 13A and 13B and a stationary mirror (not shown in the figure) opposite to the two-dimensional gimbal mirror unit 30' may be employed instead. FIGS. 13A and 13B are a plan view and a side elevational view, respectively, of the two-dimensional gimbal mirror unit 30'. In this case, the two-dimensional gimbal mirror unit 30' may be mounted at one of the positions of the scanning mirrors 30 and 31 arranged opposed to each other in the above-described embodiment. The stationary mirror (not shown in the figure) is arranged at the position of the other one of the scanning mirrors 30 and 31.

This two-dimensional gimbal mirror unit 30' includes a mirror main body 64' for reflecting light, an inner mirror frame 66' for mounting the mirror main body 64' via first hinge sections 65', an outer mirror frame 66" for mounting the inner mirror frame 66' via second hinge sections 65", and a unit having magnets 67' for generating a magnetic field. Referring to FIG. 13A, the mirror main body 64' is rocked about the y-axis and the x-axis to scan light in a desired range. Thus, the mirror mounted on the tilted surface 29 or 28 opposed to the tilted surface 28 or 29 on which this two-dimensional gimbal mirror unit 30' is mounted can be realized by the above-described stationary mirror (not shown in the figure). The outer mirror frame 66" is provided with holes 68' for adjusting screws, so that the outer mirror frame 66" can be mounted on the tilted surface 28 or 29 in the reference member 23 while the position of the mirror main body 64" is finely adjusted with respect to the reference member 23. With this structure, as a result of a non-scanning stationary mirror being used, a hinge section normally required for a scanning mirror is not necessary, and therefore, the size of the mirror can be reduced.

Additional Items

Based on the above-described embodiment, aspects of the invention with the following structures are conceivable.

1. An optical-scanning microscope apparatus comprising:
    a light source;
    a light-transmitting member for transmitting light from the light source;
    an apparatus main body for illuminating a subject with the light transmitted by the light-transmitting member, the apparatus main body including:
        a collimating optical system for converting the light transmitted by the light-transmitting member into collimated light;
        a scanning mirror for deflecting the collimated light emitted from the collimating optical system at a deflection angle smaller than 90° to scan the light over the subject;
        a focusing optical system for focusing the light scanned by the scanning mirror onto the subject; and
        a pupil-projection optical system disposed between the focusing optical system and the above-described scanning mirror; and
    a photodetector for detecting return light returning from the subject via the apparatus main body and the light-transmitting member.

2. The optical-scanning microscope apparatus according to item 1, further comprising a reference member for mounting the collimating optical system and the scanning mirror.

Because optical components are mounted on the same reference member, assembly of the optical components and adjustments, including optical-axis adjustment, can be carried out easily. Furthermore, for the same reason, the assembly precision of the optical components can be enhanced.

3. The optical-scanning microscope apparatus according to item 2, wherein the reference member includes a mounting surface on which the scanning mirror is mounted such that a deflection angle smaller than 90° relative to the optical axis of the collimating optical system is achieved at an origin thereof.

Since the mounting surface can be formed with high processing accuracy, the assembly precision can be enhanced. Furthermore, optical-axis adjustment needs only fine adjustment.

4. The optical-scanning microscope apparatus according to one of items 2 and 3, further comprising a position-adjusting mechanism for allowing the scanning mirror to be mounted on the reference member such that the position of the scanning mirror is adjustable.

The scanning mirror can be assembled with high accuracy with respect to the reference member through the use of the position-adjusting mechanism. Furthermore, in the event of a failure in the scanning mirror, the scanning mirror can be replaced. This is advantageous in extending the serviceable life span of the apparatus main body.

5. The optical-scanning microscope apparatus according to one of items 2 to 4, further comprising a focal-position changing mechanism for changing a focal position formed at an examination site in an optical-axis direction of the focusing optical system, wherein a driving device for driving the focal-position changing mechanism is mounted on the reference member.

Because the focal position of the examination site being observed can be changed using the focal-position changing mechanism, an image of a site at a desired depth can be acquired by slightly changing the focal position, and furthermore, a three-dimensional tomographic image can be acquired by continuously changing the focal-position changing mechanism.

6. The optical-scanning microscope apparatus according to item 5, further comprising a position-adjusting mechanism for allowing the driving device for driving the focal-position changing mechanism to be mounted on the reference member such that the position of the driving device is adjustable.

With the position-adjusting mechanism, the driving device for driving the focal-position changing mechanism can be assembled such that the driving device is detachable from the reference member. In the event of a failure in the driving device, the driving device can be replaced. This is advantageous in extending the serviceable life span of the apparatus main body.

7. The optical-scanning microscope apparatus according to one of items 1 and 6, wherein the driving device for driving the focal-position changing mechanism is disposed in a space defined by inner surfaces of the scanning mirror and the pupil-projection optical system in the apparatus main body.

As a result of the driving device for driving the focal-position changing mechanism being arranged as described above, the width dimension of the apparatus main body can be reduced. This allows the size of the apparatus main body to be reduced to ensure a sufficient field of view of the stereomicroscope apparatus to be used in combination with the optical-scanning microscope apparatus.

8. The optical-scanning microscope apparatus according to one of items 2 to 7, further comprising a supporting member for supporting an end of the light-transmitting member, wherein the supporting member is mounted on the reference member.

As a result of the supporting member being mounted on the reference member, assembly of components and adjustments, including optical-axis adjustment, can be carried out easily.

9. The optical-scanning microscope apparatus according to item 8, further comprising a position-adjusting mechanism for allowing the supporting member to be mounted on the reference member such that the position of the supporting member is adjustable.

With the position-adjusting mechanism, the supporting member can be assembled such that it is detachable from the reference member. In the event of a failure in the light-transmitting member, the light-transmitting member can be replaced together with the supporting member. This is advantageous in extending the serviceable life span of the apparatus main body.

10. The optical-scanning microscope apparatus according to one of items 8 and 9, wherein an end surface of the supporting member is polished oblique with respect to an optical axis so as to be flush with an end surface of the light-transmitting member.

With this structure, light reflected at the end surface of the light-transmitting member is prevented from returning to the photodetector.

11. The optical-scanning microscope apparatus according to one of items 1 to 10, further comprising a position-adjusting mechanism for allowing the pupil-projection optical system to be mounted on the reference member such that the position of the pupil-projection optical system is adjustable.

With the position-adjusting mechanism, the pupil-projection optical system can be assembled such that it is detachable from the reference member. In the event of a failure in the pupil-projection optical system, the pupil-projection optical system can be replaced. This is advantageous in extending the serviceable life span of the apparatus main body.

12. The optical-scanning microscope apparatus according to one of items 4 to 11, wherein the position-adjusting mechanism is a screw.

13. The optical-scanning microscope apparatus according to one of items 4 to 11, wherein the position-adjusting mechanism includes a screw and a shim plate, and angle adjustment is possible according to the thickness of the shim plate.

14. The optical-scanning microscope apparatus according to one of items 2 to 13, wherein a connector for detachably connecting electrical wiring is provided on the reference member.

15. The optical-scanning microscope apparatus according to one of items 1 to 14, further comprising a scanning-direction indicator denoting a direction of scanning by the scanning mirror.

Although deflection of light by the scanning mirror with an angle smaller than 90° makes it difficult to match the width direction and the length direction of the apparatus main body with the direction of scanning by the scanning mirror, the direction of an image of the subject detected by the photodetector can be displayed by providing a scanning-direction indication mechanism.

16. The optical-scanning microscope apparatus according to item 15, wherein the scanning-direction indicator is marked on an outer surface of the apparatus main body.

17. The optical-scanning microscope apparatus according to item 15, further comprising a monitor for displaying an image of the subject detected by the photodetector, wherein the scanning-direction indicator is drawn on a frame of the monitor.

18. The optical-scanning microscope apparatus according to item 15, further comprising a monitor for displaying an image of the subject detected by the photodetector, wherein the scanning-direction indicator is combined with the image of the subject.

19. The optical-scanning microscope apparatus according to item 18, wherein the scanning-direction indicator can be selectively displayed and hidden.
20. The optical-scanning microscope apparatus according to one of items 1 to 19, further comprising another scanning mirror, wherein the two scanning mirrors are single-axis-scanning micromachined mirrors opposed to each other and constitute a proximity galvanometer mirror unit.
21. The optical-scanning microscope apparatus according to item 20, wherein one of the scanning mirrors is arranged on an optical path near the light source and the other scanning mirror is arranged on an optical path near the focusing optical system, and wherein the two scanning mirrors are disposed to satisfy a conditional expression:

$$0.5 \times (\alpha + \sin^{-1}(r/(d^2+w^2/4)^{0.5})) \leq \theta < 45°$$

where $\theta$ is an incident angle at which light is incident on the one scanning mirror from the light source via the light-transmitting member,
r is a beam radius,
w is a width of the other scanning mirror,
d is a distance between the two scanning mirrors, and
$\alpha = \cos^{-1}(d/(d^2+w^2/4)^{0.5})$.
22. The optical-scanning microscope apparatus according to item 21, wherein the incident angle $\theta$ is 35° or smaller.
23. The optical-scanning microscope apparatus according to one of items 20 to 22, wherein the scanning mirrors are electromagnetically driven mirrors.
24. The optical-scanning microscope apparatus according to one of items 1 to 19, further comprising a stationary mirror disposed opposed to the scanning mirror, wherein the scanning mirror is a two-axis-scanning micromachined mirror.

As a result of a non-scanning stationary mirror being used, a hinge section required for a scanning mirror is not necessary, and therefore the size of the mirror can be reduced.

25. The optical-scanning microscope apparatus according to item 24, wherein the scanning mirror is arranged on an optical path near the light source and the stationary mirror is arranged on an optical path near the focusing optical system, and wherein the scanning mirror and the stationary mirror are disposed to satisfy a conditional expression:

$$0.5 \times (\alpha + \sin^{-1}(r/(d^2+w^2/4)^{0.5})) \leq \theta < 45°$$

where $\theta$ is an incident angle at which light is incident on the scanning mirror from the light source via the light-transmitting member,
r is a beam radius,
w is a width of the stationary mirror,
d is a distance between the scanning mirror and the stationary mirror, and
$\alpha = \cos^{-1}(d/(d^2+w^2/4)^{0.5})$.
26. The optical-scanning microscope apparatus according to item 25, wherein the incident angle $\theta$ is 35° or smaller.

It should be noted that any other embodiment achieved by partially combining any of the above-described embodiments also constitutes the present invention.

According to the present invention, astigmatism generated by the scanning mirror is suppressed to produce a high quality image. Furthermore, light is deflected by the scanning mirror for scanning such that the light is folded compactly to reduce the width dimension of the apparatus main body. This allows the apparatus main body to be arranged so as to ensure a sufficient field of view of a stereomicroscope to be used in combination therewith.

What is claimed is:

1. An optical-scanning microscope apparatus comprising:
   a light source;
   a light-transmitting member for transmitting light from the light source;
   an apparatus main body for illuminating a subject with the light transmitted by the light-transmitting member, the apparatus main body including:
      a collimating optical system for converting the light transmitted by the light-transmitting member into collimated light;
      a first scanning mirror for deflecting the collimated light emitted from the collimating optical system at a deflection angle smaller than 90° to scan the light over the subject;
      a focusing optical system for focusing the light scanned by the first scanning mirror onto the subject; and
      a pupil-projection optical system disposed between the focusing optical system and the first scanning mirror;
   a photodetector for detecting return light returning from the subject via the apparatus main body and the light-transmitting member; and
   a second scanning mirror,
   wherein the first and second scanning mirrors are single-axis-scanning micromachined mirrors opposed to each other and constitute a proximity galvanometer mirror unit, and
   one of the first and second scanning mirrors is arranged on an optical path near the light source and the other of the first and second scanning mirrors is arranged on an optical path near the focusing optical system, the first and second scanning mirrors being disposed to satisfy a conditional expression:

$$0.5 \times (\alpha + \sin^{-1}(r/(d^2+w^2/4)^{0.5})) \leq \theta < 45°$$

where $\theta$ is an incident angle at which light is incident on the one of the first and second scanning mirrors from the light source via the light-transmitting member,
r is a beam radius,
w is a width of the other of the first and second scanning mirrors,
d is a distance between the first and second scanning mirrors, and
$\alpha = \cos^{-1}(d/d^2+w^2/4)^{0.5})$.

2. The optical-scanning microscope apparatus according to claim 1, further comprising:
   a reference member for mounting the collimating optical system and the first scanning mirror.

3. The optical-scanning microscope apparatus according to claim 2, wherein the reference member includes a mounting surface on which the first scanning mirror is mounted such that a deflection angle smaller than 90° relative to the optical axis of the collimating optical system is achieved at an origin thereof.

4. The optical-scanning microscope apparatus according to claim 2, further comprising a position-adjusting mechanism for allowing the first scanning mirror to be mounted on the reference member such that the position of the first scanning mirror is adjustable.

5. The optical-scanning microscope apparatus according to claim 2, further comprising a focal-position changing mechanism for changing a focal position formed at an examination site in an optical-axis direction of the focusing optical system; wherein a driving device for driving the focal-position changing mechanism is mounted on the reference member.

6. The optical-scanning microscope apparatus according to claim 5, further comprising a position-adjusting mechanism for allowing the driving device for driving the focal-position changing mechanism to be mounted on the reference member such that the position of the driving device is adjustable.

7. The optical-scanning microscope apparatus according to claim 2, further comprising a supporting member for supporting an end of the light-transmitting member,
wherein the supporting member is mounted on the reference member.

8. The optical-scanning microscope apparatus according to claim 2, further comprising a position-adjusting mechanism for allowing the pupil-projection optical system to be mounted on the reference member such that the position of the pupil-projection optical system is adjustable.

9. The optical-scanning microscope apparatus according to claim 8, wherein the position-adjusting mechanism includes a screw and a shim plate, and angle adjustment is possible according to the thickness of the shim plate.

10. The optical-scanning microscope apparatus according to claim 2, wherein a connector for detachably connecting electrical wiring is provided on the reference member.

11. The optical-scanning microscope apparatus according to claim 5, wherein the driving device for driving the focal-position changing mechanism is disposed in a space defined by inner surfaces of the first scanning mirror and the pupil-projection optical system in the apparatus main body.

12. The optical-scanning microscope apparatus according to claim 1, further comprising a scanning-direction indicator denoting a direction of scanning by the first scanning mirror.

13. The optical-scanning microscope apparatus according to claim 12, wherein the scanning-direction indicator is marked on an outer surface of the apparatus main body.

14. The optical-scanning microscope apparatus according to claim 12, further comprising a monitor for displaying an image of the subject detected by the photodetector, wherein the scanning-direction indicator is drawn on a frame of the monitor.

15. The optical-scanning microscope apparatus according to claim 12, further comprising a monitor for displaying an image of the subject detected by the photodetector, wherein the scanning-direction indicator is combined with the image of the subject.

16. The optical-scanning microscope apparatus according to claim 1, wherein the incident angle θ is 35° or smaller.

17. The optical-scanning microscope apparatus according to claim 1, wherein the first and second scanning mirrors are electromagnetically driven mirrors.

18. An optical-scanning microscope apparatus comprising:
a light source;
a light-transmitting member for transmitting light from the light source;
an apparatus main body for illuminating a subject with the light transmitted by the light-transmitting member, the apparatus main body including:
a collimating optical system for converting the light transmitted by the light-transmitting member into collimated light;
a first scanning mirror for deflecting the collimated light emitted from the collimating optical system at a deflection angle smaller than 90° to scan the light over the subject;
a focusing optical system for focusing the light scanned by the first scanning mirror onto the subject; and
a pupil-projection optical system disposed between the focusing optical system and the first scanning mirror;
a photodetector for detecting return light returning from the subject via the apparatus main body and the light-transmitting member; and
a scanning-direction indicator denoting a direction of scanning by the first scanning mirror;
wherein the scanning-direction indicator is marked on an outer surface of the apparatus main body.

19. The optical-scanning microscope apparatus according to claim 18, further comprising a reference member for mounting the collimating optical system and the first scanning mirror.

20. The optical-scanning microscope apparatus according to claim 18, further comprising a second scanning mirror, wherein the first and second scanning mirrors are single-axis-scanning micromachined mirrors opposed to each other and constitute a proximity galvanometer mirror unit.

21. The optical-scanning microscope apparatus according to claim 18, further comprising a stationary mirror disposed opposed to the first scanning mirror, wherein the first scanning mirror is a two-axis-scanning micromachined mirror.

22. An optical-scanning microscope apparatus comprising:
a light source;
a light-transmitting member for transmitting light from the light source;
an apparatus main body for illuminating a subject with the light transmitted by the light-transmitting member, the apparatus main body including:
a collimating optical system for converting the light transmitted by the light-transmitting member into collimated light;
a first scanning mirror for deflecting the collimated light emitted from the collimating optical system at a deflection angle smaller than 90° to scan the light over the subject;
a focusing optical system for focusing the light scanned by the first scanning mirror onto the subject; and
a pupil-projection optical system disposed between the focusing optical system and the first scanning mirror;
a photodetector for detecting return light returning from the subject via the apparatus main body and the light-transmitting member;
a scanning-direction indicator denoting a direction of scanning by the first scanning mirror; and
a monitor for displaying an image of the subject detected by the photodetector;
wherein the scanning-direction indicator is drawn on a frame of the monitor.

23. The optical-scanning microscope apparatus according to claim 22, further comprising a reference member for mounting the collimating optical system and the scanning mirror.

24. The optical-scanning microscope apparatus according to claim 22, further comprising s second scanning mirror, wherein the first and second scanning mirrors are single-axis-scanning micromachined mirrors opposed to each other and constitute a proximity galvanometer mirror unit.

25. The optical-scanning microscope apparatus according to claim 22, further comprising a stationary mirror disposed opposed to the first scanning mirror, wherein the first scanning mirror is a two-axis-scanning micromachined mirror.

26. An optical-scanning microscope apparatus comprising:
   a light source;
   a light-transmitting member for transmitting light from the light source;
   an apparatus main body for illuminating a subject with the light transmitted by the light-transmitting member, the apparatus main body including:
      a collimating optical system for converting the light transmitted by the light-transmitting member into collimated light;
      a first scanning mirror for deflecting the collimated light emitted from the collimating optical system at a deflection angle smaller than 90° scan the light over the subject;
      a focusing optical system for focusing the light scanned by the first scanning mirror onto the subject; and
      a pupil-projection optical system disposed between the focusing optical system and the first scanning mirror;
   a photodetector for detecting return light returning from the subject via the apparatus main body and the light-transmitting member;
   a scanning-direction indicator demoting a direction of scanning by the first scanning mirror; and
   a monitor for displaying an image of the subject detected by the photodetector;
   wherein the scanning-direction indicator is combined with the image of the subject.

27. The optical-scanning microscope apparatus according to claim 26, further comprising a reference member for mounting the collimating optical system and the scanning mirror.

28. The optical-scanning microscope apparatus according to claim 26, further comprising a second scanning mirror, wherein the first and second scanning mirrors are single-axis-scanning micromachined mirrors opposed to each other and constitute a proximity galvanometer mirror unit.

29. The optical-scanning microscope apparatus according to claim 26, further comprising a stationary minor disposed opposed to the first scanning mirror, wherein the first scanning mirror is a two-axis-scanning micromachined mirror.

30. An optical-scanning microscope apparatus comprising:
   a light source;
   a light-transmitting member for transmitting light from the light source;
   an apparatus main body for illuminating a subject with the light transmitted by the light-transmitting member, the apparatus main body including:
      a collimating optical system for converting the light transmitted by the light-transmitting member into collimated light;
      a first scanning mirror for deflecting the collimated light emitted from the collimating optical system at a deflection angle smaller than 90° to scan the light over the subject;
      a focusing optical system for focusing the light scanned by the first scanning mirror onto the subject; and
      a pupil-projection optical system disposed between the focusing optical system and the first scanning mirror;
   a photodetector for detecting return light returning from the subject via the apparatus main body and the light-transmitting member; and
   a stationary mirror disposed opposed to the first scanning mirror,
   wherein the first scanning mirror is a two-axis-scanning micromachined mirror which is arranged on an optical path near the light source and the stationary mirror is arranged on an optical path near the focusing optical system, and
   wherein the first scanning mirror and the stationary mirror are disposed to satisfy a conditional expression:

$$0.5 \times (\alpha + \sin^{-1}(r/(d^2+w^2/4)^{0.5})) \leq \theta < 45°$$

where $\theta$ is an incident angle at which tight is incident on the first scanning mirror from the light source via the light-transmitting member,
   r is a beam radius,
   w is a width of the stationary mirror,
   d is a distance between the first scanning mirror and the stationary mirror, and
   $\alpha = \cos^{-1}(d/d^2+w^2/4)^{0.5})$.

31. The optical-scanning microscope apparatus according to claim 30, further comprising a scanning-direction indicator denoting a direction of scanning by the first scanning mirror.

32. The optical-scanning microscope apparatus according to claim 30, further comprising a second scanning mirror, wherein the first and second scanning minors are single-axis-scanning micromachined minors opposed to each other and constitute a proximity galvanometer mirror unit.

33. The optical-scanning microscope apparatus according to claim 30, wherein the incident angle $\theta$ is 35° or less.

* * * * *